United States Patent [19]

Rolle et al.

[11] Patent Number: 4,878,944

[45] Date of Patent: Nov. 7, 1989

[54] METHOD OF TREATING METALLIC OXIDE IMPREGNATED DUST

[75] Inventors: Thomas E. Rolle; D. J. Rapp, both of Dubuque, Iowa

[73] Assignee: The TDJ Group, Inc., Dubuque, Iowa

[21] Appl. No.: 262,103

[22] Filed: Oct. 18, 1988

Related U.S. Application Data

[63] Continuation of Ser. No. 127,716, Dec. 2, 1987, now abandoned.

[51] Int. Cl.$^4$ .......................... C21C 5/38; F23J 15/00
[52] U.S. Cl. ........................................ 75/25; 110/203;
110/345; 266/157; 266/159; 373/8; 373/9
[58] Field of Search ..................... 266/157, 159; 373/8,
373/9; 110/203, 215, 344, 345; 75/25

[56] References Cited

U.S. PATENT DOCUMENTS

| | | | |
|---|---|---|---|
| 4,209,335 | 6/1980 | Katayama et al. | 106/89 |
| 4,555,392 | 11/1985 | Steinberg | 110/345 |
| 4,651,653 | 3/1987 | Anderson et al. | 110/345 |

FOREIGN PATENT DOCUMENTS 95984  6/1984  Japan ................................. 110/344

*Primary Examiner*—Robert McDowell
*Attorney, Agent, or Firm*—Hill, Van Santen, Steadman & Simpson

[57] ABSTRACT

A process for treating hazardous particulate generated during a manufacturing process is provided. The process includes the steps of: passing particulate material through at least one duct toward a waste collection device; feeding an additive into the duct to be mixed with the particulate material, upstream from the waste collection device; and passing the particulate material mixed with the additive into the waste collection device. A scrap remelting apparatus is also provided.

24 Claims, 1 Drawing Sheet

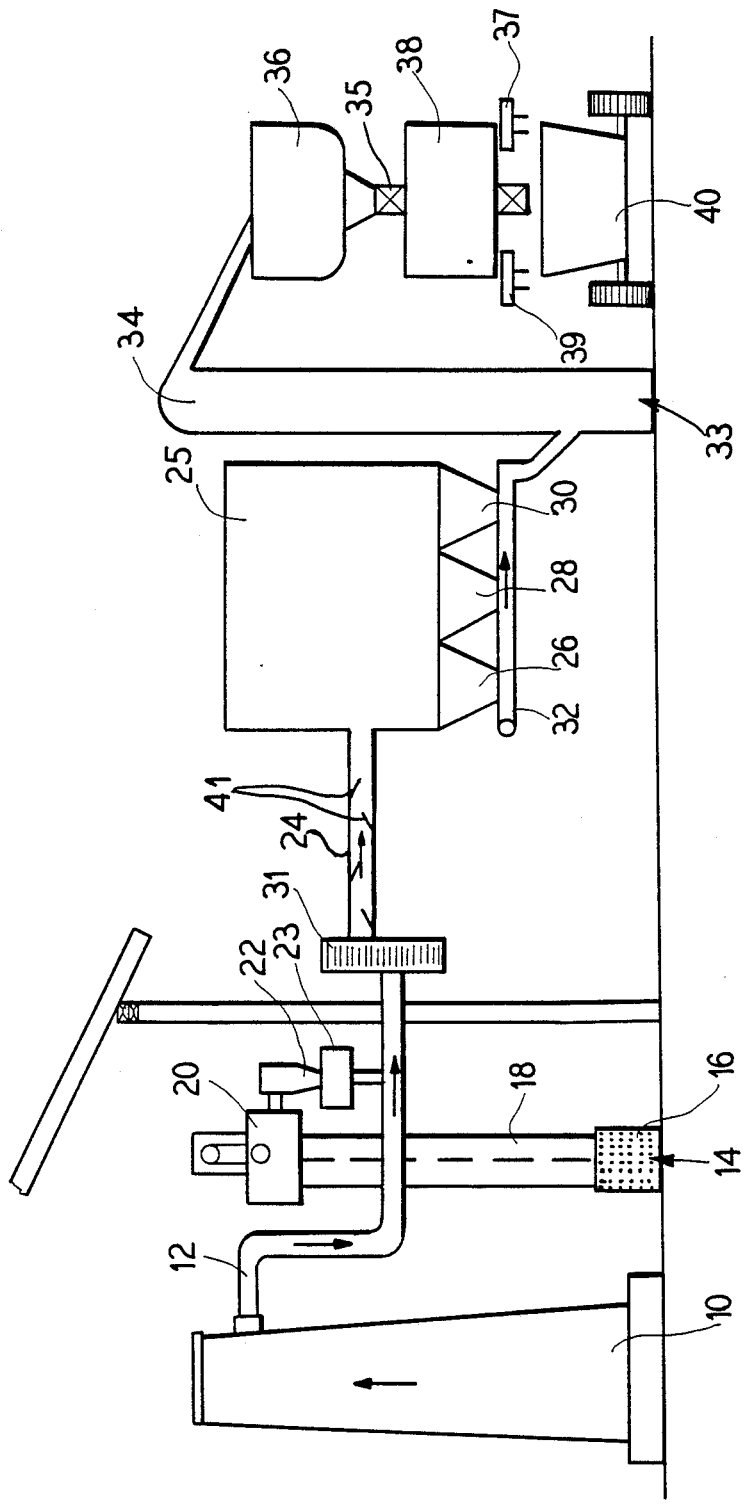

METHOD OF TREATING METALLIC OXIDE IMPREGNATED DUST

This is a continuation of application Ser. No. 127,716, filed Dec. 2, 1987, now abandoned.

BACKGROUND OF THE INVENTION

The present invention relates generally to methods for treating cupola and electric arc furnace dust and other waste materials generated during manufacturing processes. More specifically, the present invention relates to an environmentally acceptable closed system process for treating environmentally classed heavy metal oxides, generated during ferrous metal and non-ferrous scrap remelt operations.

Many industrial plants generate metallic oxide impregnated dust that includes toxic waste in the form of relatively small particulate matter. This dust can include levels of toxic metal oxide particles such as lead, cadmium, and chromium.

For example, many scrap remelt operations utilize electrical arc furnaces to recycle metal products. These furnaces produce a "dust" as a waste by-product. Due to the scrap from which these plants recycle the metals, this dust may include toxic metallic oxides. For example, in recycling engine blocks lead is generated as metallic oxide dust due to the lead that was present in the gasoline that was run through the engine and other waste materials that have become impregnated in the engine block. Likewise, metal scrap that has been painted, when it is recycled may generate lead oxide because the paint is lead based. Chromium is generated from scrap metal when metal that has been coated with zinc chromate is recycled. Likewise, it is also known for cadmium to be generated during the re-melting of scrap metals.

In a typical foundry process, scrap metal is melted in a cupola. One of the by-products produced when scrap metal is melted in a cupola is bag house dust. In a typical foundry process, bag house dust flows out of the top of the cupola, as a dust and gas stream, through a plurality of ducts to a bag house. The bag house usually contains bag filters that are used to filter the gas streams from the furnace.

Typically, the bag house dust contains a variety of types of metallic oxide particles including toxic materials such as lead, chromium, and cadmium in sufficiently high concentrations to be classified as hazardous by the Environmental Protection Agency. Because this dust is generated by subjecting metal particles to high temperatures, the dust contains oxides and is extremely dry.

Typical electric arc furnace bag house dust includes:

| Component | Weight Percent |
| --- | --- |
| Iron | 15–18 percent |
| Manganese | 2 percent |
| Nickel | less than 1 percent |
| Lead | 2–6 percent |
| Cadmium | 1–2 percent |
| Magnesium | 1–4 percent |
| Chromium | 1 percent |
| Zinc | 35–40 percent |
| Other | Balance |

(The metallic components are present as oxides.)

Because this dust contains hazardous metallic oxides, it is necessary to treat and dispose of the dust. To this end, prior art foundry processes have, for example, treated the dust by feeding the hazardous dust from the bag house to a feed silo that then mixes the hazardous dust with an additive so that the dust can then be disposed of.

Although the prior art methods can treat the hazardous dust in a manner so that it can be handled in a non-hazardous way, the Environmental Protection Agency considers any process that locates the means for treating the hazardous material outside the manufacturing process unit, i.e. downstream from the bag house, not to be an "enclosed system" which is part of the manufacturing process. See, 40 CFR 260.10. As set forth below, this classification can have important ramifications.

Foundries and other scrap remelt operations are regulated under the authority of the Solid Waste Disposal Act as amended by the Resource Conservation and Recovery Act of 1976 and as amended by the Hazardous and Solid Waste amendments of 1984 (collectively the "RCRA"). The RCRA controls and regulates the collection of bag house dust and like hazardous waste. If a system is not an enclosed system, and generates hazardous dust, then it falls under and requires an RCRA permit prior to construction and operation of the foundry. See, 40 CFR Section 261.4 (c). The process of securing an RCRA permit can take up to one year and incur a cost of up to $100,000.00 to the foundry operator. Therefore, if a means for treating metallic oxide impregnated dust within the manufacturing processing unit were developed it would result in savings in both time and money to the foundry operator.

There is therefore a need for an improved process and apparatus for treating metallic oxide impregnated dust generated during a foundry process.

SUMMARY OF THE INVENTION

The present invention provides an improved system for recycling scrap metal. More specifically, the present invention provides an improved process for treating hazardous dust so that the treatment process is part of the manufacturing process unit and accordingly affords a closed or enclosed system.

A process for treating hazardous particulate generated during a manufacturing process is provided by the present invention, the process includes the steps of: passing the particulate material through at least one duct toward a waste collection device; feeding an additive into the duct to be mixed with the particulate material, upstream from the waste collection device; and passing the particulate material mixed with the additive into the waste collection device.

In an embodiment of the present invention the additive is fed into a dry material feeder and then into an injector. The injector injects the additive into the duct to be mixed with the particulate material. If desired, the feeder can directly inject the additive into the duct. What is needed is a controlled method of injection.

In an embodiment of the present invention, preferably the additive is a binder having a pH of at least 8. By way of example, in an embodiment, the binder is a mixture of portland cement and calcium sulfoaluminate.

In an embodiment of the present invention, means are provided for directing and channeling air flow after the additive has been added to assist in integrating the particles. Preferably, the means for directing and channeling comprise a plurality of fins.

In an embodiment of the present invention, the process includes the step of wetting the particulate material and binder.

In an embodiment the process of the present invention provides a process for treating metallic oxide impregnated dust generated during a foundry and/or steel mill process.

An apparatus for treating metallic oxide impregnated dust is also provided.

Accordingly, it is an advantage of the present invention to provide a process for treating particulate material generated during a manufacturing process that is part of the manufacturing process so as to afford an enclosed system as that term is defined by the Environmental Protection Agency.

Additional features and advantages of the present invention are described in, and will be apparent from, the detailed description of the presently preferred embodiments and from the drawing.

BRIEF DESCRIPTION OF THE DRAWING

The FIGURE illustrates a schematic cross-sectional view of an embodiment of the process of the present invention.

DETAILED DESCRIPTION OF THE PRESENTLY PREFERRED EMBODIMENTS

The present invention provides an improved closed system process for treating environmentally troublesome metallic oxides as well as other materials. More specifically, the present invention provides an improved method and apparatus for treating bag house dust, or other dust, that is generated during the scrap remelting process, in a manner so that the treatment process is part of the manufacturing process and accordingly, an enclosed system is provided. This results in a remelt process that is afforded totally enclosed treatment exemption by the Environmental Protection Agency. To this end, pursuant to an embodiment of the method of the present invention, the treatment process is located downstream from the cupola but upstream from the bag house. Although the present invention is directed specifically to scrap metal remelting processes, it should be appreciated that the method of the present invention can be utilized in other similar processes.

As previously stated, in a preferred embodiment, the present invention relates to foundry and steel industry scrap remelting processes. Specifically, in a preferred embodiment, the present invention relates to foundry processes that utilize scrap metal and thereby generate bag house dust. As used herein, the term "bag house dust" refers to particles generated during the melting of scrap metal in a furnace such as cupola or electric arc furnaces. This dust contains a variety of metal oxide particles including such toxic heavy metals as lead, chromium, and cadmium in sufficiently high concentrations to be classified as hazardous by the Environmental Protection Agency. Currently, the Environmental Protection Agency's permissible levels for these heavy metals are: lead (5.0 mg/l); cadmium (1.0 mg/l); and chromium (5.0 mg/l). Because, typically metallic oxide dust, or bag house dust, generated in a foundry utilizing scrap metal includes heavy metal oxides that exceed these levels, the dust must be treated and disposed of in a manner in accordance with the regulations and requirements of the Environmental Protection Agency.

Referring now to the FIGURE, a schematic of an embodiment of the process of the present invention is illustrated. As illustrated, the foundry process of the present invention includes a cupola 10. As is typical in the foundry industry, preferably the cupola 10 is a vertical cylindrical furnace for melting scrap metal for foundry use. Preferably the cupola 10 is a coke fired furnace. However, any furnace known in the art can be utilized.

In use, metal, coke, and flux are fed into the cupola 10 onto a bed of coke, through which air is blown. The cupola 10 generates a gas that includes particulate matter including metallic oxide impregnated particles. Typically the metallic oxide particles include heavy metal oxides that exceed permissible toxicity levels set by the Environmental Protection Agency. As indicated by the arrows, the gas and solids flow out of the cupola 10 through at least one duct 12.

An apparatus 14 for treating the metallic oxide impregnated dust, present in the gas, is coupled to the duct 12 and functions to inject into the duct 12 an additive that mixes in the dust stream. Preferably, the additive is a binder that binds with the heavy metal oxides. Preferably, the binder has a pH of at least 8 and therefore, when it binds with the metallic oxide particles, it chemically stabilizes same. Accordingly, when the binder and oxide particles are disposed of, the binder prevents the metallic oxide particles from leaching out even when the mixture is subjected to a low pH solution such as acid rain. In an embodiment, preferably, the binder is a mixture of portland cement and calcium sulfoaluminate. Examples of this binder are disclosed in U.S. patent application Ser. No. 920,922, entitled "METHOD OF DISPOSING METALLIC OXIDE IMPREGNATED DUST", the disclosure of which is incorporated herein by reference.

The binder when mixed with the dust, and when moisture is added thereto, creates a cementitious material. This resultant cementitious material, i.e., the encapsulated metallic oxide particles and binder, can be used as typical cementitious material in normal fashion or, can be buried or placed on a surface if no local use for the concrete is required.

The apparatus 14 for treating the dust includes means for introducing the additive into the duct 12 and means for delivering the additive to the means for injecting. To this end, in the embodiment of the present invention illustrated in the FIGURE, a bucket closed system elevator 16 is provided. The bucket 16 provides a container into which a charge of additive is placed. An elevator 18 is provided that conveys the bucket 16 from ground level to a metering feeder and holding hopper 20. Although a bucket closed system elevator 16 is illustrated, any means for conveying the material can be utilized.

The feeder 20 functions to feed the additive to a fluidizer 22 and venturi eductor 23. The venturi eductor 23 functions to inject the additive into the duct 12 and thereby into the gas and dust stream to unite and bind with the metallic oxide particles.

The feeder 20 preferably is a dry material feeder that has good volumetric metering accuracies. It has been found that a feeder 20, available from AccuRate of White Water, Wis., as the 604 AccuRate Dry Material Feeder, functions satisfactorily. This dry material feeder has a volumetric metering accuracy of approximately +0.5 to 2 percent for most materials. Accordingly, the feeder 20 accurately feeds to the fluidizer 22 and venturi eductor 23, and thereby to the gas in the duct 12 a predetermined amount of additive.

As discussed above, the additive is fed from the feeder 20 into a special fluidizer 22. The fluidizer 22 injects, through a venturi eductor 23, the additive into the gas and dust stream. Preferably, the venturi eductor 23 can be activated by a solenoid valve. The venturi eductor 23 allows one to vary the air pressure at which the additive is injected. Depending on the fluid flow through the conduit, it may be desirable to vary the air pressure at which the additive is injected. It has been found that a fluidizer and venturi eductor available from Gustafson of Eden, Praire, MN, as Model Nos. FS 3400 and RX 1200, respectively. functions satisfactorily. Once injected into the gas and dust stream, the additive mixes with the particulate matter, and specifically binds with the metal oxide materials contained therein.

As is clearly illustrated and disclosed, the additive, or binder, is added upstream of the bag house 25. Accordingly, a closed system, as that term is defined by the Environmental Protection Agency, is afforded.

Although only one venturi eductor 23 is illustrated, it may be desirable to utilize two or more injectors at various locations before the bag house.

A blower 31 is provided for urging the dust and gas from the duct 12 into a second duct 24 toward the bag house 25. If desired, the additive can be injected by use of the blower 31. Also, if desired, the venturi eductor 23 can be located so that the additive is injected after the blower 31 that conveys the mixture through another duct 24 into the bag house 25.

In a preferred embodiment illustrated, the duct 24 includes a plurality of fins 41 that direct and channel air flow and thereby assist in integrating the particles. As used herein, the term "fin 41" refers to adjustable plates that are placed in the duct 24. To this end, the fins 41 preferably are pivotably connected to an interior of the duct 24 so that they are adjustable.

In the bag house 25, pretreated metal oxides and other particles are collected in collection bins 26, 28, and 30. Below the collection bins 26, 28, and 30, an auger 32 is located. The auger 32 functions to move the dust present in the gas and additive to a means for disposing of the materials 33.

The means for disposing of the materials 33 includes a second elevator 34 that conveys the dry materials, i.e., the additive and dust, to a holding hopper 36. A discharge valve 35 in the holding hopper 36 discharges the dry materials into a floating dust abatement unit 38. The floating dust abatement unit 38 functions to wet the dry materials so as to control dusting when discharged to the environment.

In an embodiment of the present invention, the dry materials are wetted by a plurality of atomizer nozzles located in the unit 38. The floating dust abatement unit preferably is located on load cells 37 and 39 for accurately recording the weight of the resultant waste product, i.e., the treated dust. Although two loading cells 37 and 39 are illustrated, it should be noted that any number of load cells can be utilized.

The wetting step functions to encapsulate the dry material within the binder. By wetting the additive, the binder is put into a cementitious state and can thereby encapsulate the dust. Once the dust is so encapsulated, the cementitious encapsulated dry materials are then fed into a dump hopper 40. The encapsulated dry materials are now in a state where they can be safely disposed of.

Although in the preferred embodiment illustrated, the material and binder are collected in a hopper, it should be noted that the material can be collected in some other manner, for example, in a mixing auger.

As illustrated in the FIGURE, the means for treating 14 is located upstream from the bag house 25, therefore, the treatment process is part of the manufacturing process and accordingly, the scrap remelt process of the present invention provides an enclosed system.

It should be understood that various changes and modifications to the presently preferred embodiments described herein will be apparent to those skilled in the art. Such changes and modifications can be made without departing from the spirit and scope of the present invention, and without diminishing its attendant advantages. It is thereby intended that such changes and modifications be covered by the appended claims.

We claim:

1. A process for treating and collecting metallic oxide impregnated dust generated during a manufacturing process comprising the steps of:
    passing particulate material through at least one enclosed area and toward a waste collection device;
    feeding an additive into the enclosed area to be mixed with the particulate material to create an additive-particulate material, upstream from the waste collection device; and
    passing the additive-particulate material mixture into the waste collection device.

2. The process of claim 1 including the steps of:
    feeding the additive from a dry material metering feeder into an injector; and
    feeding the additive into the enclosed area by injecting the additive into the duct with the injector.

3. The process of claim 1 wherein the additive is a binder having a pH of at least 8.

4. The process of claim 1 wherein the additive is a mixture of portland cement and calcium sulfoaluminate.

5. The process of claim 1 including the step of passing the particulate material and additive to dust abatement means and wetting the particulate material and additive.

6. The process of claim 1 wherein the enclosed area is a duct and including the step of providing in the duct at least one fin means for directing and channeling air flow, the fin means being located downstream of an apparatus for feeding the additive.

7. A process for treating and collecting metallic oxide impregnated dust generated in a manufacturing unit during a manufacturing process comprising the steps of:
    passing the metallic oxide impregnated dust from a point of generation to a waste control device;
    mixing the dust with a binder by injecting into the manufacturing unit the binder at a position upstream from the waste control device; and
    feeding the dust and binder into the waste control device.

8. The process of claim 7 including the step of feeding the dust from a dry material feeder to an injector.

9. The process of claim 7 including the step of feeding the dust and binder to a conduit for treatment.

10. The process of claim 9 including the step of wetting the dust and binder.

11. The process of claim 7 including the steps of:
    conveying a charge of binder to a feeder; and
    feeding the binder from the feeder to an injector for injecting the binder into the duct.

12. The process of claim 7 including the step of passing the dust and binder past at least one fin for directing and channeling fluid flow.

13. A process for treating metallic oxide impregnated dust, generated during a metals industry scrap remelting process, in an enclosed system comprising the steps of:
  passing gas containing dust generated in a cupola through at least one duct toward a bag house;
  providing means for injecting, within a scrap remelting manufacturing unit and upstream of the bag house, a binder;
  uniting and binding the additive with the dust in the duct by injecting, with the means for injecting, the binder into the duct;
  allowing the binder to mix with the gas; and
  collecting the treated dust and binder in the bag house.

14. The process of claim 13 including the step of wetting the dust and binder.

15. The process of claim 13 wherein the binder has a pH of at least 8.

16. The process of claim 13 wherein the binder is a portland cement and calcium sulfoaluminate mixture.

17. The process of claim 16 including the step of wetting the collected dust and binder to control dusting upon discharge.

18. The process of claim 13 including the step of passing binder and gas containing dust by a plurality of fins for directing and channeling fluid flow.

19. A scrap remelt apparatus for recycling scrap metal comprising:
  a cupola for melting scrap metal;
  at least one duct for conveying gas containing metallic oxide impregnated dust generated by the cupola to a bag house; and
  means for injecting into the duct upstream of the bag house, a binder for binding with at least some of the metallic oxide impregnated dust.

20. The scrap remelt apparatus of claim 19 wherein the means for injecting includes a venturi eductor for injecting the gas into the duct.

21. The scrap remelt apparatus of claim 19 wherein the means for injecting includes a fluidizer.

22. The scrap remelt apparatus of claim 19 including:
  an auger for moving metallic oxide impregnated dust and binder collected in the bag house; and
  means for wetting the collected metallic oxide impregnated dust and binder.

23. The scrap remelt apparatus of claim 19 wherein the means for injecting includes:
  a feeder for feeding the binder to a fluidizer; and
  the fluidizer is coupled to a venturi eductor that injects the binder into the duct.

24. The scrap remelt apparatus of claim 19 including a plurality of fins for channeling and directing fluid flow located in a duct downstream from the means for injecting.

* * * * *